United States Patent
Yoshida et al.

(10) Patent No.: US 8,195,214 B2
(45) Date of Patent: *Jun. 5, 2012

(54) POC SERVER, POC TERMINAL, FLOOR CONTROL METHOD, AND POC TERMINAL CONTROL METHOD

(75) Inventors: Naomasa Yoshida, Chiyoda-ku (JP); Yosuke Hayashi, Chiyoda-ku (JP); Atsushi Sato, Chiyoda-ku (JP); Koji Sato, Minato-ku (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 12/634,450

(22) Filed: Dec. 9, 2009

(65) Prior Publication Data

US 2010/0151896 A1 Jun. 17, 2010

Related U.S. Application Data

(63) Continuation of application No. 11/451,471, filed on Jun. 13, 2006, now Pat. No. 7,697,949.

(30) Foreign Application Priority Data

Jun. 14, 2005 (JP) ................................. 2005-173660

(51) Int. Cl.
 *H04B 7/00* (2006.01)
(52) U.S. Cl. ........................................ 455/518; 455/519
(58) Field of Classification Search ........... 455/518–521
 See application file for complete search history.

(56) References Cited

U.S. PATENT DOCUMENTS

| | | | |
|---|---|---|---|
| 5,790,954 A | 8/1998 | Tayloe et al. | |
| 6,898,436 B2 | 5/2005 | Crockett et al. | |
| 7,417,989 B1 * | 8/2008 | Doran | 370/390 |
| 7,634,558 B1 * | 12/2009 | Mangal et al. | 709/224 |
| 7,697,949 B2 * | 4/2010 | Yoshida et al. | 455/518 |
| 2002/0077136 A1 | 6/2002 | Maggenti et al. | |
| 2002/0150091 A1 | 10/2002 | Lopponen et al. | |
| 2004/0077358 A1 | 4/2004 | Bennett et al. | |
| 2004/0224678 A1 | 11/2004 | Dahod et al. | |
| 2005/0105511 A1 | 5/2005 | Poikselka | |
| 2005/0124365 A1 | 6/2005 | Balasuriya et al. | |

(Continued)

FOREIGN PATENT DOCUMENTS

JP 2005-518169 A 6/2005

(Continued)

OTHER PUBLICATIONS

Japanese Office Action dated Jan. 15, 2008 including English translation (Five (5) pages).

(Continued)

*Primary Examiner* — Raymond Dean
(74) *Attorney, Agent, or Firm* — Crowell & Moring LLP (57) ABSTRACT

A floor can be fairly acquired in a PoC communication. In the PoC server which controls a floor in a PoC communication, a floor is put in an idle state in a PoC communication after a session establishing process required in the PoC communication. The information about the floor idle state is notified to terminals TA and TC which perform the PoC communication. When the PoC communication is initiated, the idle state of the floor is simultaneously noticed to both calling and called users, thereby realizing fair acquisition of a floor.

3 Claims, 10 Drawing Sheets

U.S. PATENT DOCUMENTS

2006/0046757 A1* 3/2006 Hoover et al. ............... 455/518

FOREIGN PATENT DOCUMENTS

| | | |
|---|---|---|
| JP | 2007-503182 A | 2/2007 |
| KR | 10-2004-0094275 A | 11/2004 |
| WO | WO 2005/043944 A1 | 5/2005 |

OTHER PUBLICATIONS

"Push-to-Talk over Cellular (PoC) User Plane", Transport Protocols, Aug. 2003, V1.1.0, pp. 1-37, XP000863836.

Korean Office Action dated Jul. 31, 2007 including English translation (Seven (7) pages).
European Search Report dated Aug. 20, 20007 (Eight (8) pages).
Push to Talk over Cellular (PoC) Charter, Open Mobile Alliance, Oct. 2003, pp. 1-3.
Push to Talk over Cellular Requirements, Open Mobile Alliance, Nov. 2004, Version 1.0, pp. 1-76.
"Push-to-Talk over Cellular (PoC) User Plane; Transport Protocols; PoC Release 2.0", Transport Protocols V2.0.6 (Jun. 2004), 39 pages.
Korean Office Action (4 pages) w/English translation (3 pages).

* cited by examiner

| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|---|---|
| V | | P | | Subtype=6 | | | | PT1=204 | | | | | | | | Length | | | | | | | | | | | | | | | |
| SSRC1 |||||||||||||||||||||||||||||||||
| name=PoC1 |||||||||||||||||||||||||||||||||
| Reason code |||||||| Additional information ||||||||||||||||||||||||

FIG. 4B

| Reason code | 1 : Only one User | WHEN THERE IS ONE USER |
|---|---|---|
| | 2 : Talk burst too long | |
| | 3 : No access to floor | WHEN RTP PACKET IS TRANSMITTED BY NON-MATCHING STATE BETWEEN MOBILE UNIT AND NW SIDE AT RECOVERY FROM DEAD SPOT, ETC |
| | 4 : Floor grace period announce | |
| Additional information | Reason code:SET 0 WHEN 1 OR 3 | |
| | Reason code2 | SET TIME UNTIL NEXT FLOOR IS ACQUIRED |
| | Reason code4 | SET REMAINING TIME FOR POSSIBLY ACQUIRING NEXT FLOOR |

| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|---|---|
| V | P | Subtype=1 ||||| PT1=204 ||||||||| Length |||||||||||||||||
| SSRC1 ||||||||||||||||||||||||||||||||
| name=PoC1 ||||||||||||||||||||||||||||||||
| T2-timer=101 |||||||| T2-length=2 |||||||| Stop talking time value ||||||||||||||||
| P-count=100 |||||||| P-count-length=2 |||||||| participants ||||||||||||||||
| Alert-Margin=XXX |||||||| Alert-Margin-length=2 |||||||| Alert-Margin value ||||||||||||||||

POC SERVER, POC TERMINAL, FLOOR CONTROL METHOD, AND POC TERMINAL CONTROL METHOD

BACKGROUND OF THE INVENTION

1. Field of the Invention

The present invention relates to a PoC server, a PoC terminal, a floor control method, and a PoC terminal control method, and more specifically to a PoC server, a PoC terminal, a floor control method, and a PoC terminal control method for realizing a PoC communication in a mobile object communication network.

2. Description of the Related Art

Realization of PoC (Push-to-Talk over Cellular) communication is scheduled which makes it possible to use a mobile terminal device, such as a cellular phone, like a transceiver and realize communication among multiple users in a group only by touching a button.

PoC communication is quick communication means to be used between two users or in a group, and it is possible to use a terminal device like a transceiver in the PoC communication. The operation for starting conversation is performed not by pressing dial buttons but by simply pressing a particular button.

Currently, PoC communication is standardized (OMA-RD_PoC-V1_0-20041115-C) based on the PoC Charter (OMA-CHARTER_PoC-V1_0-20031014-A) by the OMA (Open Mobile Alliance), an industry organization which promotes standardization of mobile application techniques.

In order to perform PoC communication, it is the premise that a communication channel has been already formed. Following a Registration message and an INVITE message by SIP (SessionInitiationProtocol), acquisition of the floor (right to speak) by RTP (Real Time Protocol) is performed.

Description will be made on processings from starting PoC communication when a communication channel has not been formed yet to ending the PoC communication, with reference to FIGS. 9 to 14. In the figures, there are shown three terminals TA, TB and TC which are provided with a PoC communication function and a PoC server 100 which controls a PoC communication service.

(Formation of a Communication Channel)

Figure 10:
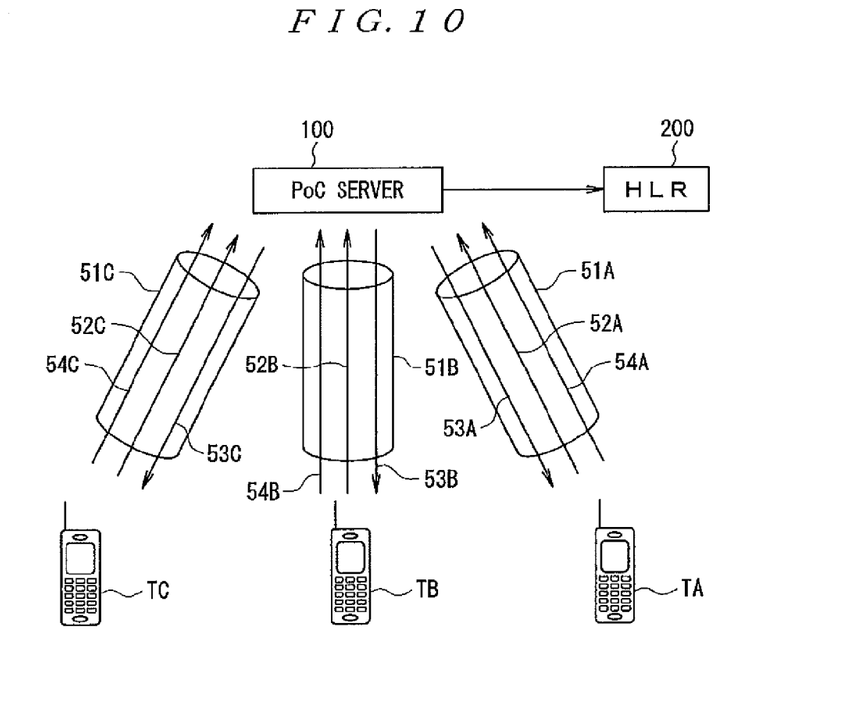
FIG. 10 shows the state of a registration process.

In order to perform PoC communication, it is necessary that a communication channel have been formed as a premise. To form a communication channel, communication channel establishment request signals 50A, 50B and 50C are sent by the respective terminals to the PoC server 100. Thereby, receiving the communication channel establishment request signals 50A, 50B and 50C, the PoC server 100 forms communications channels 51A, 51B and 51C between the respective terminals and itself, as shown in FIG. 10. These communication channels 51A, 51B and 51C are communication channels enabling packet communication, such as a GPRS (General Packet Radio Service) network and a WLAN (Wireless Local Area Network). The PoC server performs position registration processing and the like for the terminals against a subscriber information management server (Home Location Register Server) 200.

(Registration Processing and Invitation Processing)

After the communication channels 51A, 51B and 51C are formed by the above processing, Registration processing is performed. In this example, the Registration processing is performed by the terminal TA of a user A, and a PoC conversation group consisted of the three users A, B and C is specified. In the Registration processing, REGISTER messages 52A, 52B and 52C are sent by the terminal TA of the user A, the terminal TB of the user B and the terminal TC of the user C, respectively. When 200 OK signals 54A, 54B and 54C are sent after response signals 53A, 53B and 53C from the PoC server to the sent REGISTER message are received, respectively, the Registration processing is completed.

Figure 11:
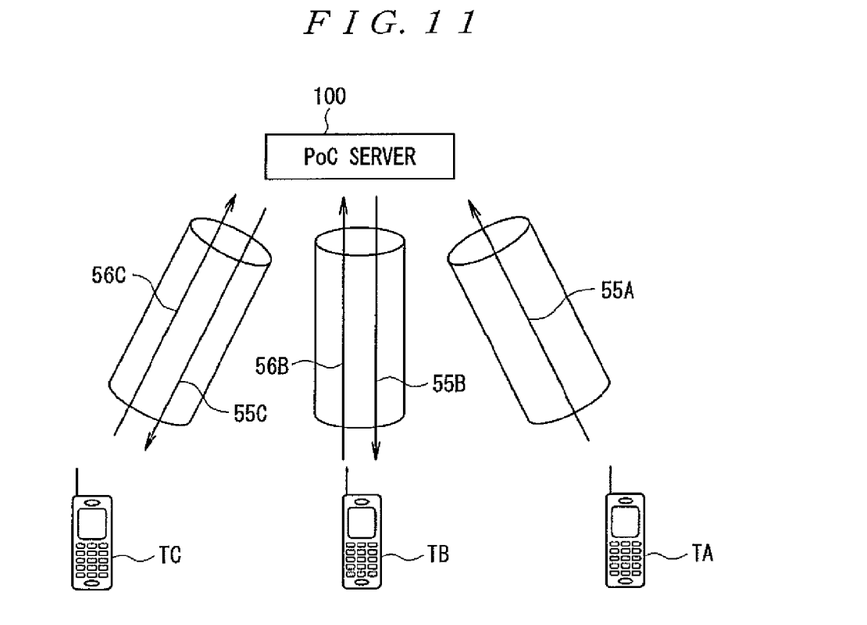
FIG. 11 shows the state of an invitation process.

After the Registration processing, the process proceeds to Invitation processing. In the Invitation processing, an INVITE message 55A is sent from the terminal TA of the user A to the terminal TB of the user B and the terminal TC of the user C in the same PoC conversation group, as shown in FIG. 11. This INVITE message includes destination information (information for identifying the terminal TB of the user B and the terminal TC of the user C), transmission source information (information for identifying the terminal TA of the user A), a call identifier (such as a Call-ID), a header portion configured by a transmission route and the like, and a body portion configured by detailed information about the medium (classification whether voice or picture, band and the like).

If the terminals TB and TC of the user B and the user C are set to an automatic mode when they receive the INVITE messages 55B and 55C sent via the PoC server 100, then 200 OK signals 56B and 56C are automatically sent, and PoC communication is enabled. On the other hand, if the terminals TB and TC are set to a manual mode, then a 180 ringing signal is automatically sent first (not shown). Furthermore, by performing an operation such as pressing a button, the 200 OK signals 56B and 56C are outputted, and thereby, PoC communication is enabled.

When, while only the terminal TA of the user A and the terminal TB of the user B are performing PoC communication with each other, an operation such as pressing a button is performed on the terminal TC of the user C in the same PoC conversation group, a 200 OK signal is outputted, and PoC communication by the three users A, B and C is enabled. That is, any member in the same PoC conversation group can join PoC communication later by performing an operation such as pressing a button.

In order to disconnect PoC communication, a BYE message is sent from a terminal to the PoC server. Thereby, the terminal leaves the PoC conversation group which it has joined.

The above processing is performed in accordance with SIP (Session Initiation Protocol) provided in the specification RFC3261 by the IETF (Internet Engineering Task Force).

(Acquisition of the Floor)

In PoC communication, a user cannot speak without acquiring the floor. That is, a user can be a speaker only when he has the floor. He is a listener when he does not have the floor.

Figure 12:
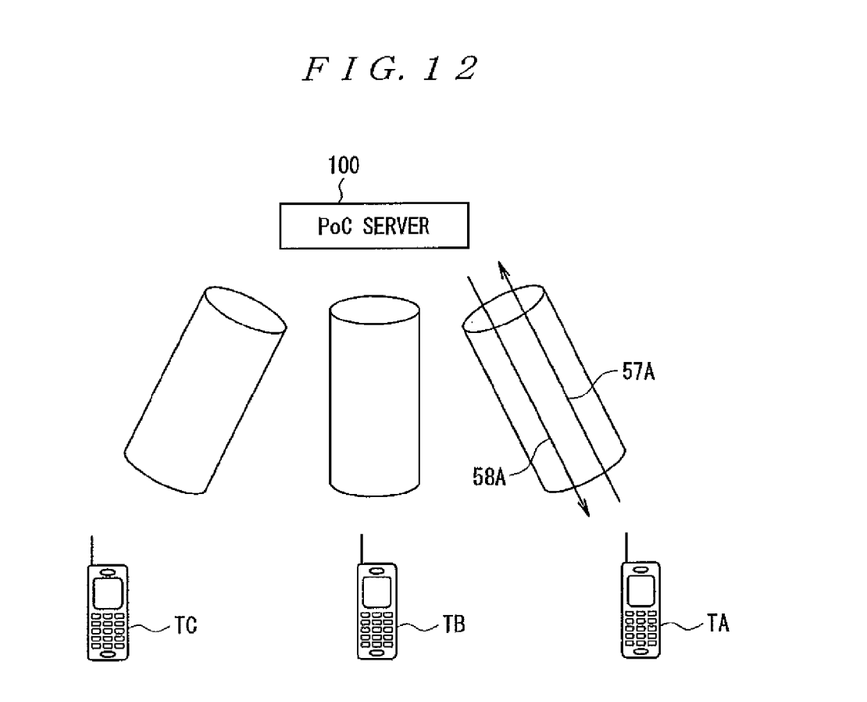
FIG. 12 shows the process of acquiring a floor in the state in which a PoC communication is performed.

In order to acquire the floor when PoC communication is being performed, it is necessary to send and receive signals in accordance with RTP (Real-time Transport Protocol) and send a Floor Request signal. Here, as shown in FIG. 12, a floor request signal 57A is sent from the terminal TA of the user A. If the PoC server which has received the fluor request signal 57A permits the floor, it returns a Floor Grant signal 58A to the terminal TA of the user A. The floor grant signal 58A includes identification information about the terminal to which the floor is permitted, information indicating the time of permission, and the like.

Figure 13:
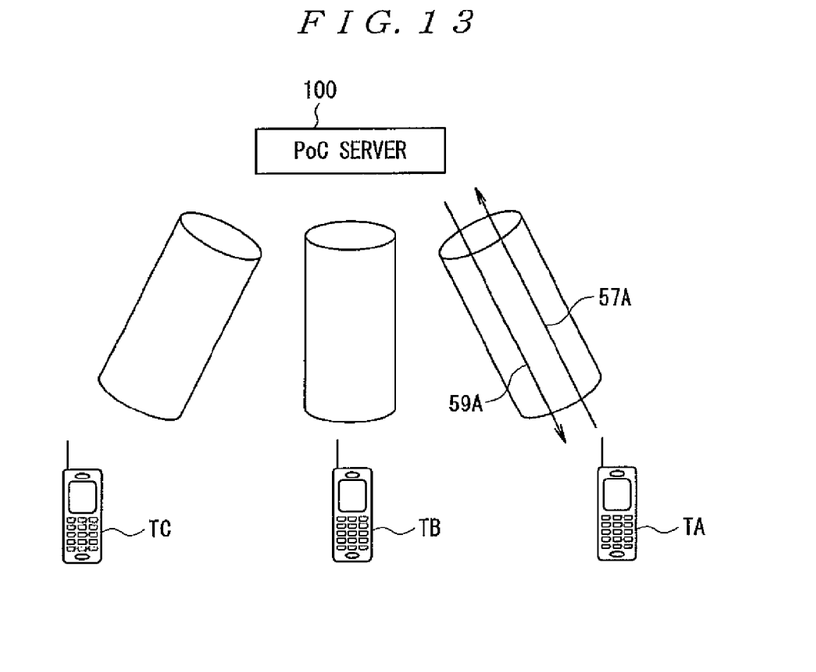
FIG. 13 shows the process performed when a floor cannot be acquired in the state in which a PoC communication is performed.

On the other hand, if the PoC server which has received the floor request signal 57A does not permit the floor, it returns a Floor Deny signal 59A, as shown in FIG. 13. This floor deny signal 59A includes identification information about the terminal to which the floor is not permitted, identification information about the terminal which currently has the floor, information about the time of permission, and the like.

Figure 14:
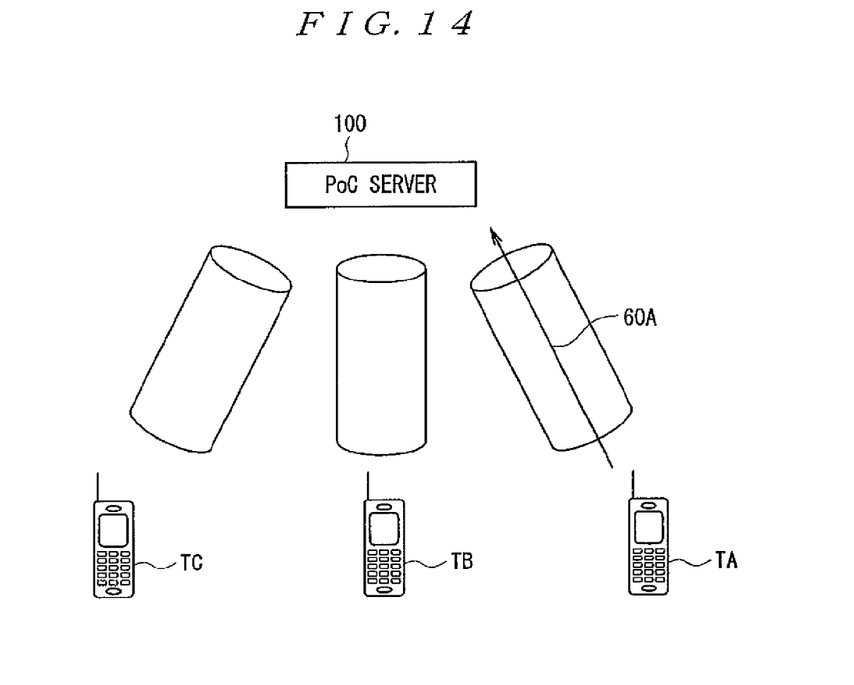
FIG. 14 shows the process of releasing a floor in the state in which a PoC communication is performed.

By making a speech while pressing a button, in the terminal which has the floor, the voice is sent to other terminals in the same PoC conversation group as packet data, and it is possible to speak in the group. The floor is held while the button is pressed. If the finger leaves the button and stops pressing it, the floor is lost. In this case, when pressing the button is stopped, a Floor Release signal 60A is sent from the terminal to the PoC server as shown in FIG. 14, and a state is caused in which no terminal has the floor (Floor Idle).

In addition to releasing the floor by releasing a button from the condition of being pressed as described above, the floor may be released by time-out of a timer.

Figure 15:
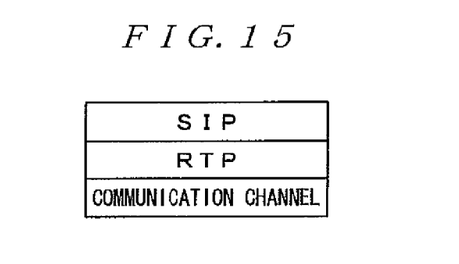
FIG. 15 shows the hierarchical structure of a protocol used in the PoC communication system.

The protocol for performing the PoC communication described above has a hierarchical structure. That is, as shown in FIG. 15, the protocol has a structure in which RTP is located above a communication channel, and SIP is located above RTP.

SUMMARY OF THE INVENTION

Floor when Poc Communication is Initiated

Figure 16:
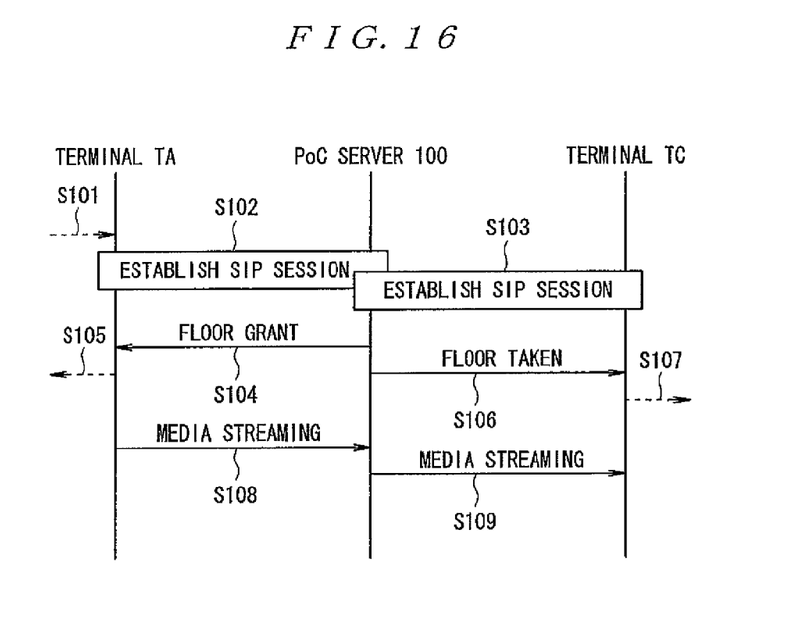
FIG. 16 is a sequence chart showing the operation performed when a PoC communication is initiated.

In the above-mentioned PoC communication system according to the OMA specification, when the called terminal (terminal TB or terminal TC in the case above) returns a response, the terminal which has transmitted a connection request (terminal TA in the case above) is controlled to acquire a floor. It is explained below by referring to FIG. 16. In FIG. 16, the operations of the terminal TA, the terminal TC, and the PoC server 100 performed when the PoC communication is initiated are shown.

When a predetermined button is operated in the terminal TA to initiate the PoC communication (S101), a SIP session establishing process is performed between the terminal TA and the PoC server 100 (S102). Also, the SIP session establishing process is performed between the PoC server 100 and the terminal TC (S103).

Then, the PoC server 100 transmits a floor grant signal indicating the permission of a floor to the terminal TA (S104). Thus, the user of the terminal TA can recognize the permission of a floor (S105). On the other hand, the PoC server 100 transmits a floor taken signal indicating the identification information about the user who has acquired a floor to the terminal TC (S106). Thus, the user of the terminal TC can recognize that the user of the terminal TA is the speaker (S107). Then, when the user of the terminal TA speaks, a media streaming signal is transmitted to the terminal TC through the PoC server 100, thereby transmitting and receiving audio and video data (S108, S109). The floor grant signal and the floor taken signal are transmitted and received by a packet (hereinafter referred to as an APP packet) of an RTCP (RTF control protocol) for defining a specific function of an application. A media streaming signal is transmitted and received by a packet of the RTP.

In the above-mentioned processes, a terminal which has transmitted a connection request acquires a floor on a priority basis. In this method, there can be a case where the acquisition of a floor is unfairly permitted, and there can be the problem that although a user of a terminal first acquiring a floor (terminal TA in the case above) speaks nothing, other users cannot acquire a floor without waiting until a floor is released to them.

(Releasing a Floor)

Figure 17:
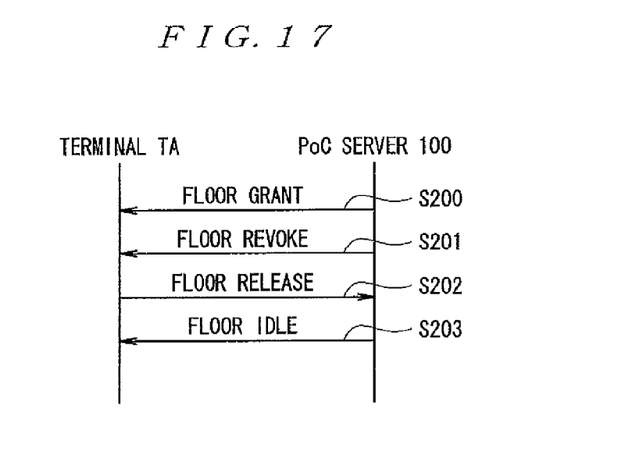
FIG. 17 is a sequence chart showing the operation performed when a floor is released.

In the PoC communication system according to the above-mentioned OMA specification, a procedure of notifying that a floor is released when a terminal acquires a floor, and a floor is released after a predetermined time is prescribed. That is, as shown in FIG. 17, it is assumed that a floor grant signal is transmitted from the PoC server 100 to the terminal TA which has acquired a floor (S200). Then, the PoC server 100 transmits a floor revoke signal to the terminal TA which has acquired a floor to notify the terminal that a floor is going to be released (S201). Then, the terminal TA immediately transmits a floor release signal to the PoC server 100 (S202). Upon receipt of the signal, the PoC server 100 transmits to the terminal TA a floor idle signal indicating that a floor is released (S203).

However, since a user who has acquired a floor does not know the remaining time (that is, a time period up to the expiration time) of the floor, there can be the case where a floor is released during speech, thereby causing an inconvenience.

The present invention has been developed to solve the above-mentioned problems, and an object of the present invention is to provide a PoC server, a PoC terminal, a floor control method, and a PoC terminal control method capable of realizing fair acquisition of a floor.

Another object of the present invention is to provide a PoC server, a PoC terminal, a floor control method, a PoC terminal control method capable of allowing a user to know the remaining time of his or her floor.

The PoC server according to claim 1 of the present invention controls a floor in a PoC communication, and includes: setting means for setting a floor idle state in the PoC communication after a session establishing process necessary for the PoC communication; and floor idle-notification means for notifying a terminal which performs the PoC communication that the floor is released. When the PoC communication is initiated, a floor idle state is simultaneously notified to both calling and called users, thereby realizing fair acquisition of a floor.

The PoC server according to claim 2 of the present invention controls a floor in a PoC communication, and includes advance-release-notification means for notifying a PoC terminal which has acquired a floor for a predetermined time of at least one of an advance-release-notice, a remaining time of the floor, and time up to a warning operation for an advance-release-notice before releasing the floor. By notifying a PoC terminal which has acquired a floor of an advance-release-notice of a floor and remaining time of the floor, the convenience of a user can be enhanced.

In the PoC server according to claim 3 based on claim 2, when the advance-release-notification means gives a notice of time up to a warning operation for an advance-release-notice, the means notifies of the remaining time up to termination of a floor and an alert margin indicating time from the warning operation to the termination of the floor when a floor permission notification is issued. By notifying of an alert margin indicating time from a warning operation to the termination of a floor together with the remaining time up to the termination of the floor, the time from a warning to the termination of the floor can be leveled independent of a model specification on the PoC terminal side.

The PoC terminal according to claim 4 of the present invention includes: reception means for receiving an advance-release-notification of a floor transmitted from a PoC server which controls a floor in a PoC communication; and warning means for performing a predetermined warning operation when the reception means receives the advance-release-notification. When a user receives an advance-release-notification, the notification is made by voice, display on a display unit, vibration, etc., thereby enhancing the convenience of a user.

The floor control method according to claim 5 of the present invention controls a floor in a PoC communication, and includes: a step of setting a floor idle state in the PoC communication after a session establishing process necessary for the PoC communication; and a step of notifying a PoC terminal which performs the PoC communication that the floor is idle. By simultaneously notifying both users of calling and called terminals of a floor idle state when a PoC communication is initiated, fair acquisition of a floor can be realized.

The floor control method according to claim 6 of the present invention controls a floor in a PoC communication, and includes a step of notifying a PoC terminal which has been provided with a floor of at least one of an advance-release-notice, a remaining time of the floor, and time taken up to an issue of a warning for an advance-release-notice before releasing the floor. By notifying the PoC terminal which has acquired a floor of an advance-release-notice of the floor and the remaining time, the convenience of the user can be enhanced.

The PoC terminal control method according to claim 7 of the present invention includes: a receiving step of receiving an advance-release-notification of a floor transmitted from a PoC server which controls a floor in a PoC communication; and a warning step of performing a predetermined warning operation when the advance-release-notification is received in the receiving step. When an advance release-notification is received, the notification is made by voice, display on a display unit, vibration, etc., thereby enhancing the convenience of a user.

As described above, the present invention has the effect of realizing fair acquisition of a floor by simultaneously notifying both users of calling and called terminals of a floor idle state when a PoC communication is initiated.

Furthermore, by notifying the PoC terminal which has acquired a floor of an advance-release-notice of the floor and the remaining time, a warning that the floor is released is given, thereby enhancing the convenience of the user.

Furthermore, by notifying of an alert margin indicating the time from a warning operation to the termination of a floor together with the remaining time up to the termination of the floor when a floor permission notification is issued, the time from a warning to the termination of the floor can be leveled independent of a model specification on the PoC terminal side, thereby realizing a leveled PoC service.

DETAILED DESCRIPTION OF THE PREFERRED EMBODIMENTS

The modes for embodying the present invention are described below by referring to the attached drawings. In the description below, the common components in the figures are assigned the same reference numerals.
(Configuration of PoC Terminal)

Figure 2:
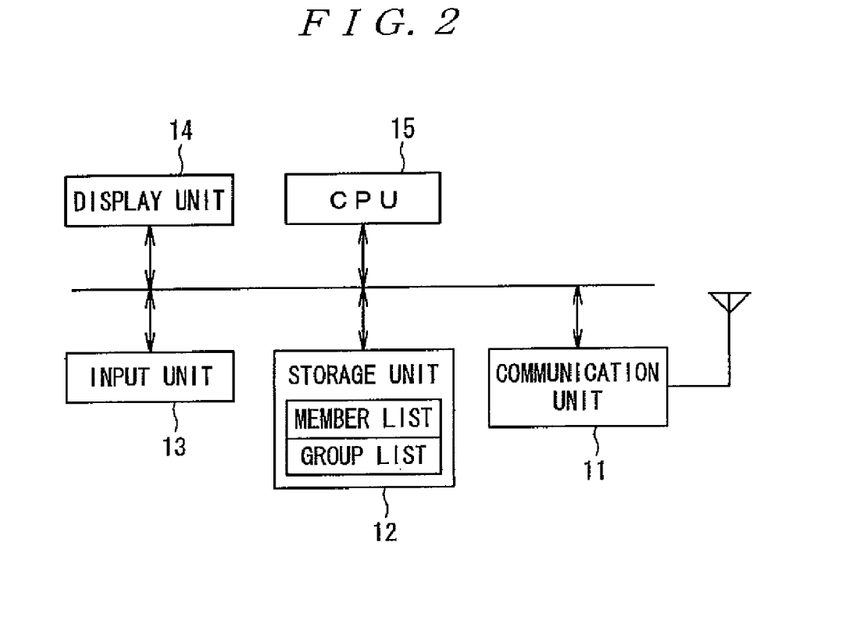
FIG. 2 is a block diagram showing an example of the configuration of a PoC terminal according to a mode for embodying the present invention.

FIG. 2 is a block diagram showing an example of the configuration of a PoC terminal according to a mode for embodying the present invention. In FIG. 2, the PoC terminal according to the present mode for embodying the invention includes a communication unit 11 for communication with an external device such as a PoC server, etc., a storage unit 12 for storing various types of information, an input unit 13 for inputting various types of information, a display unit 14 for displaying various types of information, and a CPU (central processing unit) 15 for controlling each unit.

The storage unit 12 stores, for example, a member list of members performing a PoC communication, a group list of groups. The group name in a PoC communication is associated with the identification information about a terminal which has currently acquired a floor and stored in the storage unit 12.

The input unit 13 includes an operation button for use in performing a PoC communication.
(Configuration of PoC Server)

Figure 3:
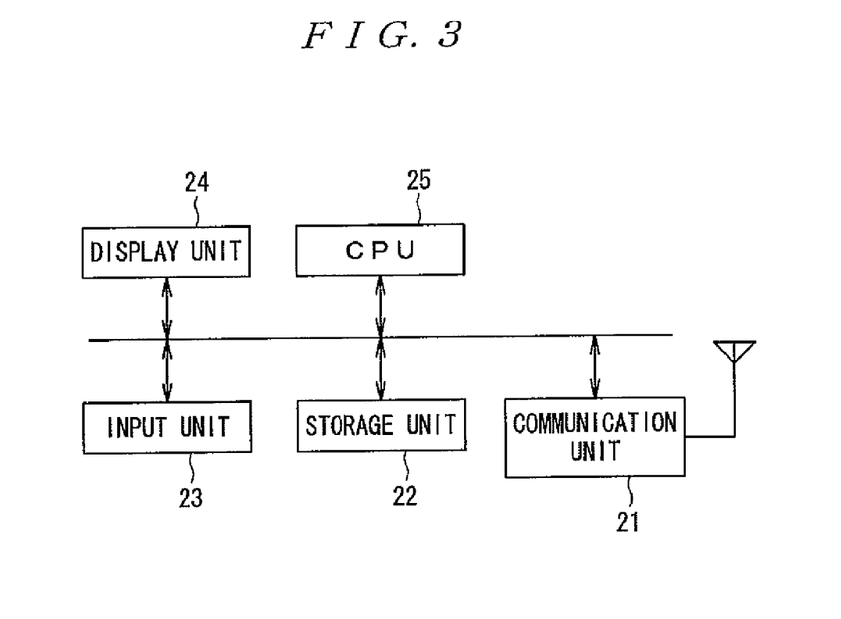
FIG. 3 is a block diagram showing an example of the configuration of a PoC server according to a mode for embodying the present invention.

FIG. 3 is a showing an example of the configuration of a PoC server. In FIG. 3, the PoC server according to the present mode for embodying the invention includes a communication unit 21 for communication with an external device such as a PoC terminal, etc. a storage unit 22 for storing various types of information, an input unit 23 for inputting various types of information, a display unit 24 for displaying various types of information, and a CPU (central processing unit) 25 for controlling each unit.
(When PoC Communication is Initiated:)

Figure 1:
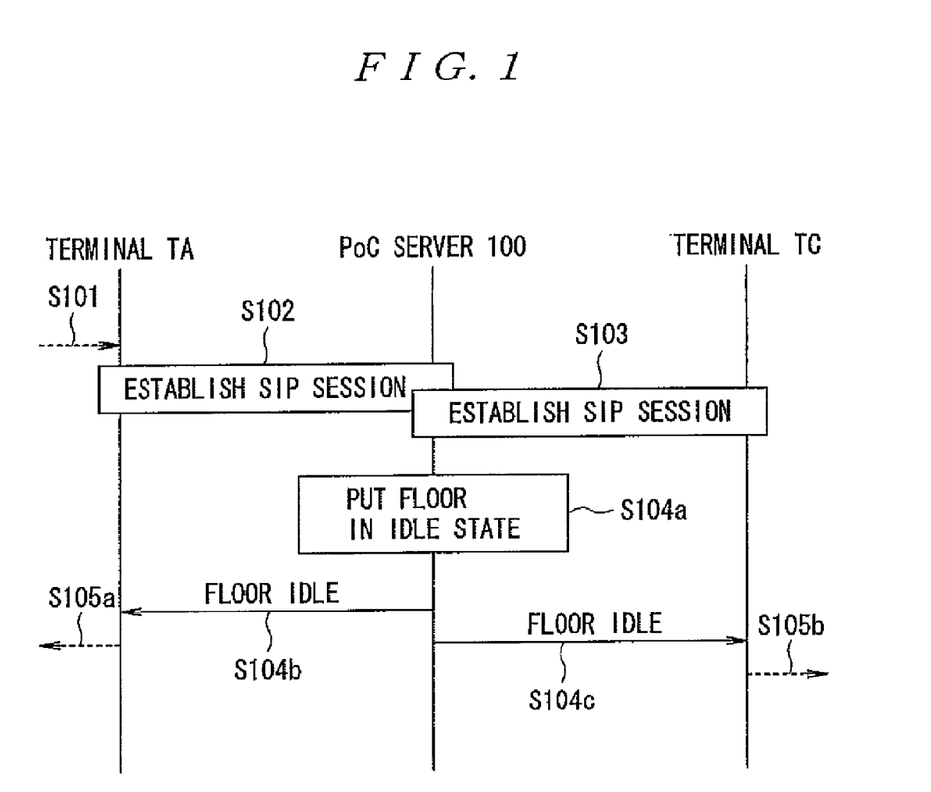
FIG. 1 is a sequence chart showing the operation performed when a PoC communication is initiated according to a mode for embodying the present invention.

FIG. 1 is a sequence chart showing the operation of the entire PoC communication system using a PoC terminal and a PoC server according to a mode for embodying the present invention. In FIG. 1, the operations of the terminal TA, the terminal TC, and the PoC server 100 are shown when the PoC communication is initiated.

To initiate the PoC communication, when a predetermined button is pressed in the terminal TA (S101), a SIP session establishing process is performed between the terminal TA and the PoC server 100 (S102). The SIP session establishing process is also performed between the PoC server 100 and the terminal TC (S103).

Then, unlike the case shown in FIG. 16, the PoC server 100 sets a floor in a release state (S104a), and transmits a floor idle signal indicating that the floor is in an idle state to the terminal TA and the terminal TC (S104b, 104c). Thus, the user of the terminal TA and the user of the terminal TC can recognize that the floor is in the idle state (S105a, 105b). The floor idle signal is transmitted and received in an APP packet.

As described above, in this system, after the establishment of a PoC session, a calling user (user of the terminal TA) and a called user (user of the terminal TC) are notified that a floor is in an idle state. Thus, since it is controlled that the PoC communication is initiated from the state in which a floor is idle, the floor can be fairly acquired.

(Structure of Packet)

Figure 4A:
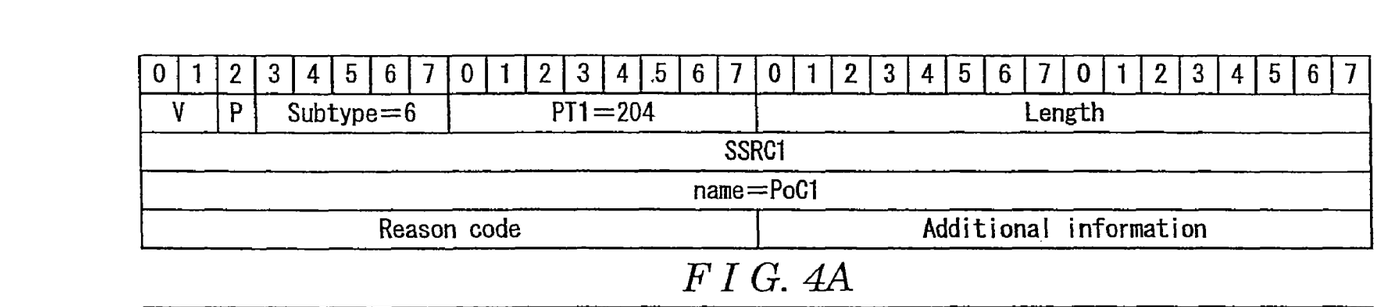
FIGS. 4A and 4B show an example of the structure of an APP packet.

FIG. 4A shows an example of the structure of an APP packet. In FIG. 4A, the APP packet includes the number "V" indicating the version of the RTP, "P" which is a bit indicating the presence/absence of a Padding octet, "Subtype" defined for a unique name of an APP packet set, or application-dependent data, "Packet Type" for identification of a packet as an APP packet of the RTCP, "Length" indicating the length of a packet, "SSRC" as an identifier indicating the source of the RTP packet, "Reason code", and "Additional information". When "Subtype" is "6", it is indicated that this packet is floor revoke in the PoC application.

Figure 4B:
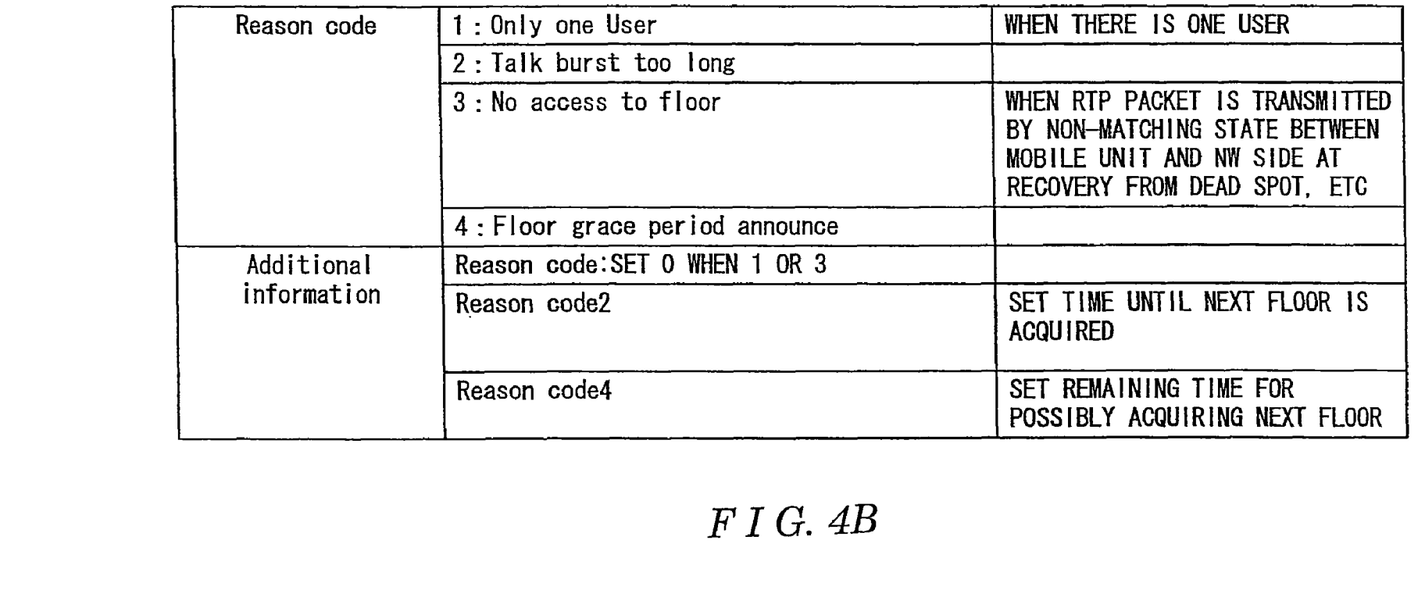

As shown in FIG. 4B, "Reason code" has the following meanings. That is, "1" indicates "Only one user", "2" indicates "Talk burst too long", and "3" indicates "No access to floor". In addition, "4" added in the present mode for embodying the invention indicates "Floor grace period announce". In this case, the remaining time of the floor is set in "Additional information". In the case of "2", the time taken to acquire the next floor is set.

(Floor Release-Notification)

Figure 5:
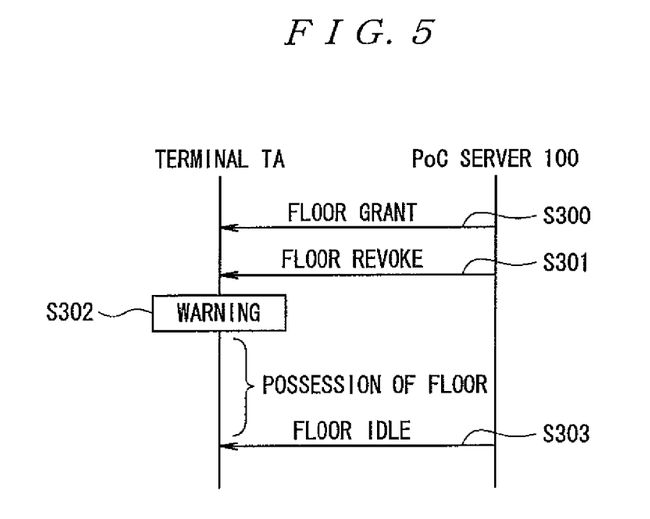
FIG. 5 is a sequence chart showing an example of the operations performed when an advance-release-notice of a floor is issued.

The exemplary operation performed when an advance-release-notice of a floor in the present mode for embodying the invention is described below by referring to FIG. 5. In FIG. 5, it is assumed that the PoC server 100 transmits a floor grant signal to the terminal TA which has acquired a floor (S300). Then, the PoC server 100 transmits a floor revoke signal to the terminal TA which has acquired a floor (S301). Unlike the case shown in FIG. 17, the floor revoke signal also means the notification of the remaining time of a floor. Therefore, the PoC server 100 does not transmit a floor revoke signal immediately before releasing a floor, but transmits a floor revoke signal only a predetermined time before the release time.

The terminal TA which has received the floor revoke signal gives the user a warning that a floor is to be released soon by voice, display on the display unit, the vibration, etc (S302). The value of remaining time of a floor can be displayed on the display unit. After the warning is given, the user can continue acquiring the floor within the remaining time of the floor.

Afterwards, when the expiration time of the floor comes (the remaining time of the floor is 0), the floor is released, and the PoC server 100 transmits a floor idle signal indicating that the floor is released to the terminal TA (S303).

Furthermore, a warning can be issued before the termination of a floor. An example of an operation in this case is explained by referring to FIG. 6. In the present embodiment, as in the case shown in FIG. 5, the PoC server 100 transmits a floor grant signal to the terminal TA that has obtained a floor (S350). However, unlike the case shown in FIG. 5, the floor grant signal includes the information about the remaining time T2 up to the termination of the floor and the information about the alert margin Tam indicating the time from the warning operation to the termination of the floor.

Figure 6:
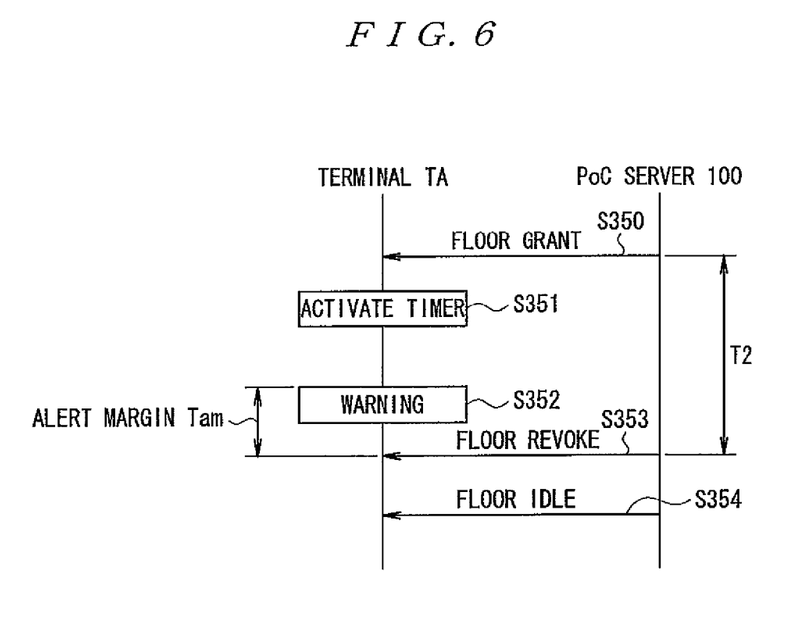
FIG. 6 is a sequence chart showing another example of the operations performed when an advance-release-notice of a floor is issued.

Upon receipt of the notification, the terminal TA activates the timer, and starts counting the time of the remaining time T2 up to the termination of the floor (S351). The timer can be realized by the software in the terminal TA. When the remaining time counted by the timer reaches the alert margin Tam, the terminal TA notifies the user by voice, display on a display unit, vibration, etc. that the floor is to be released soon (S352).

Otherwise, upon receipt of the notification, the terminal TA can obtain the time up to the warning operation by subtracting the alert margin Tam from the remaining time T2 up to the termination of the floor, activate the timer, and start counting the remaining time up to the warning operation (S351). The timer can be realized by the software in the terminal TA. In this case, when the remaining time counted by the timer reaches 0, the terminal TA notifies the user by voice, display on a display unit, vibration, etc. that the floor is to be released soon (S352).

The value of the remaining time of a floor can also be displayed on the display unit. After the warning is issued, the user can continue speaking within the remaining time of the floor. The remaining time T2 up to the termination of the floor is, for example, 30 seconds, and the alert margin Tam is, for example, 5 seconds.

Then, the PoC server 100 transmits a floor revoke signal immediately before the floor is released (S353). Thus, the floor is released, and the PoC server 100 transmits to the terminal TA a floor idle signal indicating that the floor is released (S354).

That is, in the present example, by transmitting a notification of the remaining time up to the termination of the floor and the alert margin indicating the time from the warning operation to the termination of the floor when a floor permission notification is issued, the time up to the warning operation is noticed for an advance-release-notice. Thus, by including the remaining time up to the termination of the floor and an alert margin in the floor grant signal as a floor permission notification, the time from a warning to the termination of the floor can be leveled independent of the model specification on the PoC terminal side, thereby realizing a leveled PoC service. Furthermore, without a floor grant signal, the remaining time up to the termination of the floor and the alert margin can be transmitted by a signal as a warning of floor termination. However, in this case, there will be more number of signals.

Figure 7:
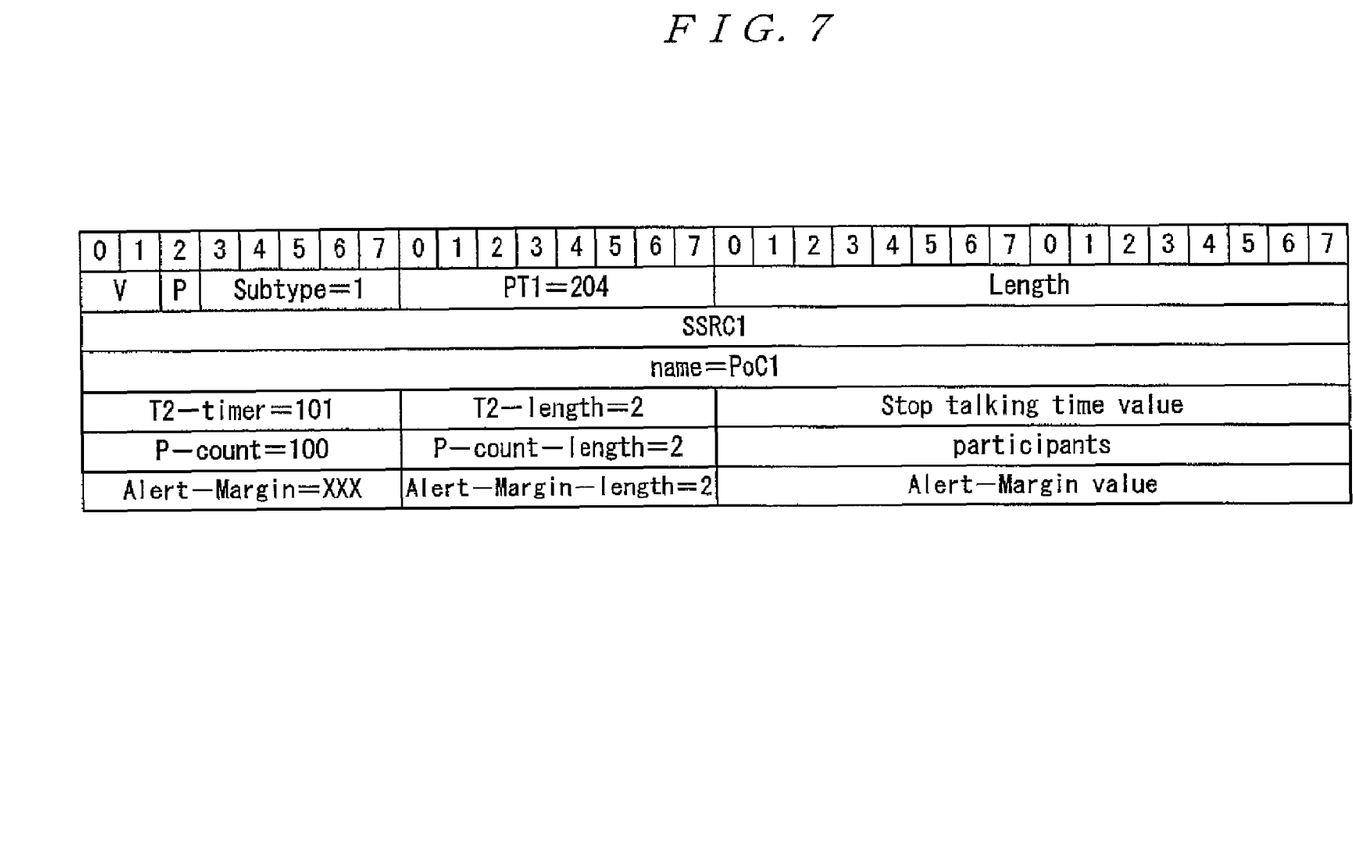
FIG. 7 shows an example of the structure of a packet of the floor grant signal shown in FIG. 6.

FIG. 7 shows an example of the structure of a packet of the floor grant signal shown in FIG. 6. In FIG. 7, unlike the case shown in FIG. 4A, "Subtype" is "1", showing that the packet is Floor Grant. Relating to the remaining time "T2-timer" up to the termination of the floor, after the contents of "101" as an identifier, and "2" octet as the length of the information, the information "Stop talking time value" indicating the value of the T2 is inserted. Furthermore, relating to the alert margin "Alert-margin", after the contents of the identifier "xxx" (a specific value is not fixed), and "2" octet as the length of the information, the information "Alert-margin value" indicating the value of the alert margin is inserted. Relating to the "p-count" indicating the number of participants, after the contents of "100" as an identifier, and "2" octet as the length of the information, the information about the number of participants is inserted between the "T2-timer" and "Alert-margin". The information about the number of participants can be omitted.

Figure 8:
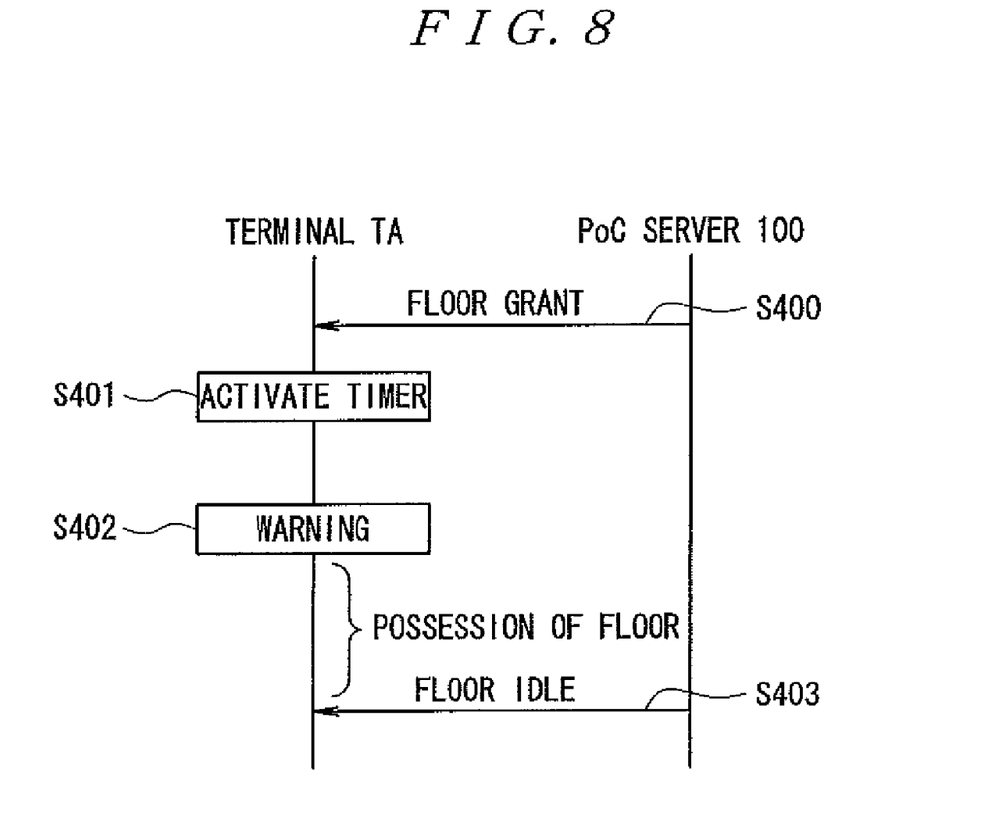
FIG. 8 is a sequence chart showing another example of the operations performed when an advance-release-notice of a floor is issued.
Figure 9:
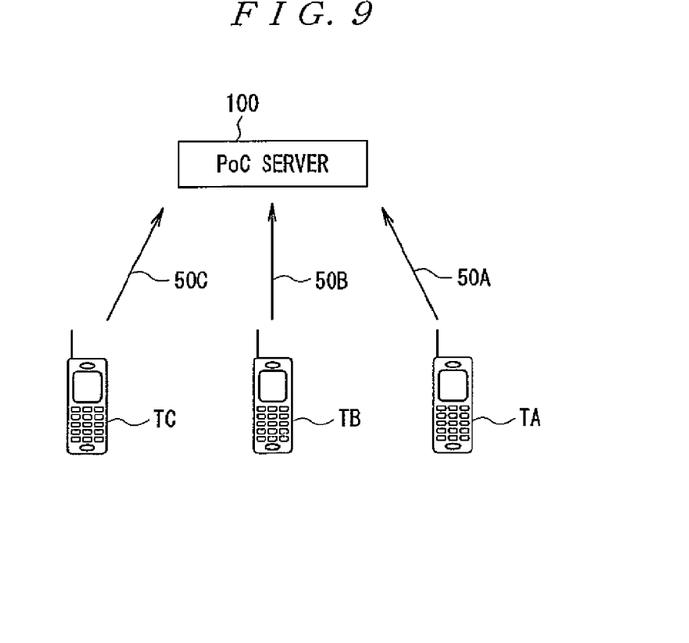
FIG. 9 shows the process of initiating a PoC communication from the state in which a communication channel has not been established.

When the information about the remaining time of a floor (that is, the period up to the expiration time) is included in the floor grant signal to be transmitted when a floor is acquired, and then transmitted, it is not necessary to transmit the floor revoke signal shown in FIG. 5. In this case, as shown in FIG. 8, when the notification that a floor has been acquired is transmitted, the PoC server 100 transmits a floor grant signal to the terminal TA which has acquired a floor (S400). The floor grant signal includes the information about the remaining time of a floor, and the timer is activated in the terminal TA (S401). When a predetermined time before the expiration time of the floor is reached based on the time kept by the timer, the warning that the floor will soon be released by voice, display on the display unit, the vibration, etc. (S402). The value of the remaining time of a floor can be displayed on the display unit. After the warning is given, the user can continue acquiring the floor within the remaining time of the floor.

Then, when the expiration time of a floor is reached (the remaining time of the floor is zero), the floor is released, and the PoC server 100 transmits a floor idle signal indicating the idle state of a floor to the terminal TA (S403).

Thus, if at least one of the advance-release-notice of a floor, the remaining time of a floor, and the time taken up to an issue of a warning for an advance-release-notice is noticed by the PoC server 100, a warning that a floor will soon be released can be given to the terminal TA. That is, if the advance-release-notice of a floor is included in a floor revoke signal, a warning can be issued a predetermined time after the reception time. If a remaining time of a floor or the time taken up to an issue of a warning for an advance-release-notice is included in the floor grant signal, the timer is to be activated depending on the received contents, and a warning is to be issued when a predetermined time before the expiration time of a floor is reached based on the time kept by the times.

(Floor Control Method)

In the above-mentioned PoC communication system, the following floor control method is read. That is, a floor control method for controlling a floor in a PoC communication including a step (S104a shown in FIG. 1) of setting a floor idle state in the PoC communication after a session establishing process necessary for the PoC communication, and a step (S104b, S104c shown in FIG. 1) of notifying a PoC terminal which performs the PoC communication that the floor is idle is realized. As shown in FIG. 1, when the PoC communication is initiated, a floor idle state is simultaneously notified to both calling and called users, thereby realizing fair acquisition of a floor.

Additionally, the floor control method for controlling a floor in a PoC communication, and including a step (S301 shown in FIG. 5, S350 shown in FIG. 6, and S400 shown in FIG. 8) of notifying a PoC terminal which has been provided with a floor of at least one of an advance-release-notice, a remaining time of the floor, and the time taken up to an issue of a warning for an advance-release-notice before releasing the floor is realized. As shown in FIG. 5, 6, or 8, by notifying the PoC terminal which has acquired a floor of an advance-release-notice of the floor, the remaining time of the floor, and the time taken up to an issue of a warning for an advance-release-notice, the convenience of the user can be enhanced.

Furthermore, the floor control method including a receiving step (S301 shown in FIG. 5, and S400 shown in FIG. 8) of receiving an advance-release-notification of a floor transmitted from a PoC server which controls a floor in a PoC communication, and a warning step (S302 shown in FIG. 5, and S402 shown in FIG. 8) of performing a predetermined warning operation when the advance-release-notification is received in the receiving step is realized. As shown in FIGS. 5 and 8, when an advance-release-notification is received, the notification is made by voice, display on a display unit, vibration, etc., thereby enhancing the convenience of a user.

CONCLUSION

In the current specification of the OMA, a connection request user acquires a floor when a called user receives a call. However, in the present invention, a PoC communication is controlled to be initiated from the state in which a floor is idle. Therefore, a floor can be fairly acquired.

Furthermore, in the current specification of the OMA, when a floor acquired for a predetermined time is released, it is a mere notice to a user. On the other hand, according to the present invention, the remaining time of a floor is noticed to a user. Therefore, the convenience of a user can be enhanced.

The present invention can flexibly correspond with the needs of users by differentiating the procedure of services about the control of the acquisition of a floor in a PoC communication service.

What is claimed is:

1. A PoC (Push-to-talk Over Cellular) server which controls a floor in a PoC communication, the PoC server comprising:
   setting means for setting a floor idle state in the PoC communication to all terminals that will participate in the PoC communication, after a session establishing process necessary for the PoC communication is performed and before the session starts;
   floor release-notification means for notifying all the terminals that will participate in the PoC communication of a signal indicating that the floor is released; and
   advance-release-notification means for notifying a terminal which has acquired a floor for a predetermined time of at least one of an advance-release-notification, a remaining time of the floor, and a time up to a warning operation for advance-release-notification before the floor is released;
   wherein the PoC communication starts with the floor being released.

2. A floor control method for controlling a floor in a PoC (Push-to-talk Over Cellular) communication, the method comprising:
   setting a floor idle state in the PoC communication to all terminals that will participate in the PoC communication, after a session establishing process necessary for the PoC communication is performed and before the session starts;
   notifying all the terminals that will participate in the PoC communication of a signal indicating that the floor is released; and
   notifying a terminal which has acquired a floor for a predetermined time of at least one of an advance-release-notification, a remaining time of the floor, and a time up to a warning operation for advance-release-notification before the floor is released;
   wherein the PoC communication starts with the floor being released.

3. A PoC (Push-to-talk Over Cellular) terminal control method, the method comprising:
   receiving an advance-release-notification of a floor transmitted from a PoC server which controls a floor in a PoC communication;
   receiving a floor grant signal including a remaining time of the floor and a time up to a warning operation for the advance-release-notification; and
   performing a predetermined warning operation after the floor grant signal is received;
   wherein the floor grant signal includes the remaining time up to termination of the floor and an alert margin indicating time from the warning operation to the termination of the floor when a floor permission notification is issued.

* * * * *